Figure 2:
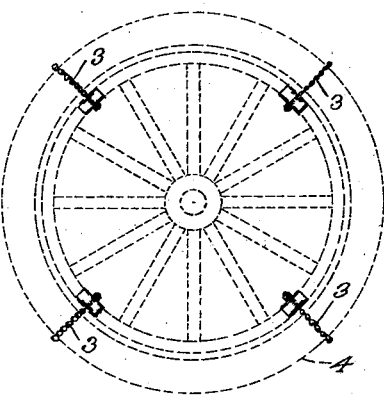

March 10, 1925.

E. C. REED

NONSKID DEVICE

Filed April 20, 1923

1,529,447

INVENTOR

Edward Clayton Reed

Patented Mar. 10, 1925.

1,529,447

UNITED STATES PATENT OFFICE.

EDWARD CLAYTON REED, OF MIDDLEBORO, MASSACHUSETTS.

NONSKID DEVICE.

Application filed April 20, 1923. Serial No. 633,379.

*To all whom it may concern:*

Be it known that I, EDWARD C. REED, a citizen of the United States, residing at Middleboro, in the county of Plymouth and Commonwealth of Massachusetts, have invented a new and useful Nonskid Device.

This invention relates to a novel and improved non-skid device having means for quick adjustment and attachment to a wheel and tire, and means for tensioning the tread member.

The invention will be best understood by reference to the following description, when taken in connection with the accompanying drawings of one specific embodiment thereof, while its scope will be more particularly pointed out in the appended claims.

Figure 1:
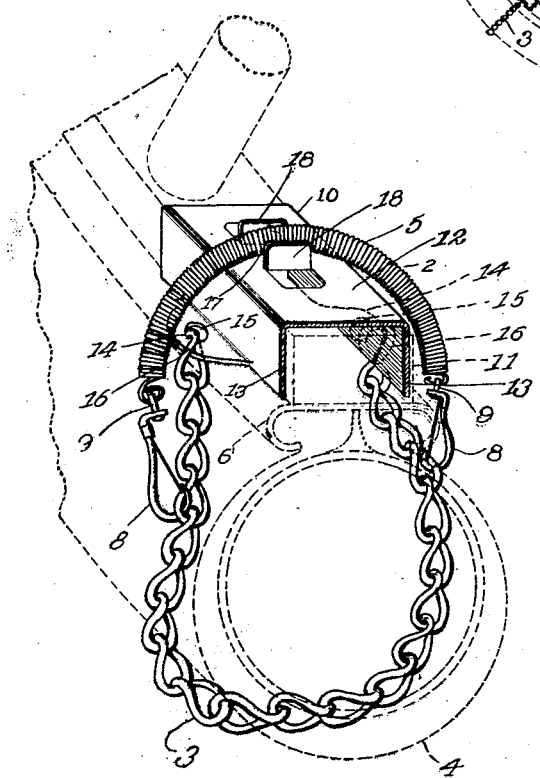

In the drawings:

Fig. 1 is a perspective view of a non-skid device exemplifying the invention, a portion of a wheel with its rim and tire being indicated in dotted lines; and Fig. 2 is a side elevation on a reduced scale of four of the non-skid devices as applied to a wheel, the latter being indicated in dotted lines.

Referring to the drawings, and to the embodiment of the invention which is selected for exemplification, there is shown a non-skid tread member, herein a chain 3, preferably having curb links adapted to extend across the tread of a tire 4. A tread-tensioning member, herein a helically coiled spring 5, is adapted to extend across the wheel rim 6, and is attached to opposite sides of the chain, as by snap hooks 8, herein attached to the terminal portions of the spring by swivels 9. The device can be accommodated to tires and rims of various sizes within reasonable limits, and tensioned thereon by attaching the snap hooks to the sides of the chains at different points, as the circumstances may require, and when properly attached, the spring takes up the slack in the chain, and causes the latter to embrace the tire snugly.

In the present example, the chain is further held by a chain-holder 10, adapted to be applied to the wheel in the present example, to the felloe 11, which is a part of the wheel. In the present embodiment of the invention, this chain-holder is conveniently formed of metal in one piece, presenting a web 12 and a pair of flanges 13, the latter being adapted to embrace a portion of the wheel. The terminal portions of the chain are appropriately secured to the holder, as by providing the latter with laterally extending flanges 14, presenting openings 15 to receive S-hooks 16 forming the terminals of the chain.

In the present example, the spring is received in the opening 17 presented by the holder, said opening herein being conveniently formed by a pair of lugs 18, struck up from the web 12. This opening properly positions the spring with relation to the holder, and prevents one from slipping circumferentially of the wheel with relation to the other.

In applying the device to a wheel, the holder is first applied to the wheel, then the terminal hooks of the chains are hooked onto the holder, next the spring is placed across the holder, and finally the snap hooks are attached to opposite sides of the chain at such points as will place the spring under tension and take up the slack from that portion of the chain which extends across the tire tread. Between these points and the points of attachment of the chain to the holder, there will of course be a certain amount of slack, but the spring on the one hand resiliently yet firmly holds the chain across the tire tread, and on the other hand, resiliently and firmly holds the holder itself on the rim.

Having thus described one embodiment of the invention, but without limiting myself thereto, what I claim and desire by Letters Patent to secure is:

1. In a non-skid device for application to a wheel and tire, the combination of a chain adapted to extend across the tire, a chain holder adapted to extend across a portion of the wheel and presenting lateral flanges to which said chain is secured at opposite sides, said holder presenting an opening, and a chain-tensioning spring received in said opening and secured to said chain at opposite sides.

2. In a non-skid device for application to a wheel and tire, the combination of a chain adapted to extend across the tire, a chain holder adapted to extend across a portion of the wheel and presenting lateral flanges provided with openings which receive opposite terminal portions of said chain, and a chain-tensioning spring extending across said holder and having opposite terminal portions secured to said chain at opposite sides.

3. In a non-skid device for application to a wheel and tire, the combination of a chain adapted to extend across the tire, a chain holder adapted to extend across a portion of the wheel and presenting lateral flanges provided with openings which receive opposite terminal portions of said chain, and a chain-tensioning spring extending across said holder and having snap fasteners fastened into said chain at opposite sides.

4. In a non-skid device for application to a wheel and tire, the combination of a chain presenting terminal hooks, a chain holder adapted to extend across a portion of the wheel and presenting means receiving said hooks, and a chain-tensioning spring extending across said holder and secured to said chain at opposite sides.

5. In a non-skid device for application to a wheel and tire, the combination of a chain adapted to extend across a tire, a chain holder adapted to be applied to a portion of a wheel and to which the terminal portions of said chain are attached, and a chain-tensioning spring adapted to extend across a portion of the wheel and secured to said chain at opposite sides.

6. In a non-skid device for application to a wheel and tire, the combination of a chain adapted to extend across the tire, a chain-tensioning spring adapted to extend across a portion of the wheel and having terminal portions attached to opposite sides of said chain, and a holder for application to a portion of the wheel and having chain-receiving means and spring receiving means.

7. In a non-skid device for application to a wheel and tire, the combination of a chain adapted to extend across the tire, and a chain-tensioning spring adapted to extend across a portion of the wheel and having terminal portions adjustably secured to opposite sides of said chain.

8. In a non-skid device for application to a wheel and tire, the combination of a chain adapted to extend across the tire, a chain-tensioning spring adapted to extend across a portion of the wheel and having terminal portions adjustably secured to opposite sides of said chain, and a holder adapted to be interposed between said spring and a portion of the wheel and held in place by the cooperative action of said chain and said spring.

9. In a non-skid device for application to a wheel and tire, the combination of a non-skid tread member adapted to extend across the tire-tread, a holder adapted to be applied to a portion of the wheel, and a tread-tensioning member adapted to extend across a portion of the wheel and secured to opposite sides of said tread member, said member being held by said holder.

EDWARD CLAYTON REED.